United States Patent [19]

Paul

[11] 4,089,277
[45] May 16, 1978

[54] SOLID WASTE DISPOSAL

[76] Inventor: Franklin O. Paul, 7006 Penarth Ave., Upper Darby, Pa. 19082

[21] Appl. No.: 737,087

[22] Filed: Oct. 29, 1976

[51] Int. Cl.² ............................................. F23G 5/04
[52] U.S. Cl. .................................. 110/204; 110/228; 110/234
[58] Field of Search ..................... 110/8 R, 10, 14, 15, 110/49 R, 110

[56] References Cited

U.S. PATENT DOCUMENTS

| 2,213,668 | 9/1940 | Dundas et al. | 110/15 |
| 2,730,971 | 1/1956 | Birkner | 110/49 |
| 3,027,854 | 4/1962 | Akerlund | 110/15 |
| 3,774,555 | 11/1973 | Turner | 110/15 |
| 3,942,455 | 3/1976 | Wallis | 110/110 |
| 4,009,667 | 3/1977 | Tyer et al. | 110/110 |

Primary Examiner—Kenneth W. Sprague
Attorney, Agent, or Firm—Weiser, Stapler & Spivak

[57] ABSTRACT

An entirely dry, solid waste disposal system is provided which incinerates waste in a manner to minimize pollution and to utilize the heat energy which is a by-product of the incineration. The waste material is shredded and then dried by mixing it with heated ambient air in an elongated dryer. A helix propels the waste through the dryer and into a combustion chamber together with the hot ambient air which was employed to dry the waste material. The hot gases resulting from incinerating the wastes are directed to a boiler wherein steam is generated. The steam thus produced is used to generate electricity and additionally may be utilized as a source of heat for heating or drying. The hot gases from the combustion chamber and the boiler are fed to the dryer for waste drying purposes. Exhaust gases from the dryer are fed to a scrubber to remove any remaining pollutants prior to being exhausted into the atmosphere.

7 Claims, 7 Drawing Figures 4,089,277

SOLID WASTE DISPOSAL

BACKGROUND OF THE INVENTION

This invention relates to a dry solid waste disposal system which minimizes environmental pollution and which efficiently utilizes the heat energy which is generated as a by-product of the system.

The buring of trash, such as in large municipal incinerators has been and is, one of the most common methods of disposing of solid wastes. By burning the solid waste in incinerators, the volume of the trash can be substantially reduced. Additionally, the decay of organic wastes, with its attendant unpleasant odors, can be substantially eliminated. Problems resulting from the simple burning of solid wastes have received considerable notoriety and study in that the gases produced by the incineration represent a substantial contribution to air pollution. In a great majority of large incinerator installations, the heat generated represents wasted and unused energy, inasmuch as no economical apparatus has heretofore been available to reclaim this heat energy. There are solid waste disposal systems in the prior art which attempt to deal with these concerns in various manners. It is well known in the prior art to use scrubbers to remove pollutants from waste gases prior to their exhaust to the atmosphere. The prior art also discloses incinerators wherein the heat generated by the burning of waste products is used as an energy source. Some have proven efficient in utilizing the heat energy produced by the incineration of the waste products but have been inefficient in removing pollutants from the atmosphere. Others have been efficient at removing pollutants but not in utilizing the heat energy. Still other prior art structures have attempted to accomplish both objectives but have been too expensive or inefficient, or both.

SUMMARY OF THE INVENTION

It is an object of the present invention to provide an improved solid waste disposal system suitable for incinerating solid wastes without substantially contributing to environmental pollution.

It is another object of the present invention to provide a dry solid waste disposal system designed to burn solid wastes and to utilize the heat energy which is generated by the burning.

It is a further object of the present invention to provide a dry solid waste disposal system for burning solid wastes in a manner in which environmental pollution is minimized and in which the heat energy generated by the burning is efficiently employed for useful purposes.

It is a further object of the present invention to provide a solid waste disposal system in which the heat generated as a by-product of the burning of the solid wastes is utilized in the system operation.

A further object of the invention is to provide a dry solid waste disposal system wherein the waste material is efficiently dried prior to incineration by employing the waste heat produced by the system.

A still further object of the present invention is to provide a solid waste disposal system wherein the solid waste is dried prior to incineration by heated ambient air and wherein the pollutant laden air used for drying is used as a fuel source in the incineration process.

Other and further objectives and advantages will be apparent in the following description taken with the accompanying drawings.

The present invention achieves the aforesaid objects by providing a single exhaust for the air taken into the system and for the gases generated by the system. Ambient air introduced into the system is used, after heating, to dry previously shredded solid wastes. The dried wastes are fed into an incinerator together with the air used for drying. The drying air, which is laden with pollutants and noxious gases from the dried wastes is used to partially fuel the incinerator. The hot gases which result from the incineration process are directed from the incinerator to a boiler wherein steam is generated. The generated steam may be employed to drive a turbine for generating electricity or for other work producing purposes. The electricity there produced can be utilized directly within the system to drive various electric motors and other components used to convey the waste material and to propel the gases through the system. After driving the turbine, the exhaust steam may then be used for heating or other purposes. The hot gases resulting from the incineration process, subsequent to the generation of steam, can be used to heat ambient air entering the system. All exhaust gases are directly or indirectly directed through duct work from the combustion chamber of the incinerator, from the boiler and from the dryer and are passed through a scrubber prior to being exhausted to the atmosphere. In this manner, both the air entering the system and the gases generated by the system are used for a multitude of purposes within the system. The exhaust gases are treated to have pollutants removed therefrom prior to re-entering the atmosphere.

BRIEF DESCRIPTION OF THE DRAWINGS

In the drawings, in which like numerals refer to like parts.

DESCRIPTION OF THE PREFERRED EMBODIMENT

Figure 1:
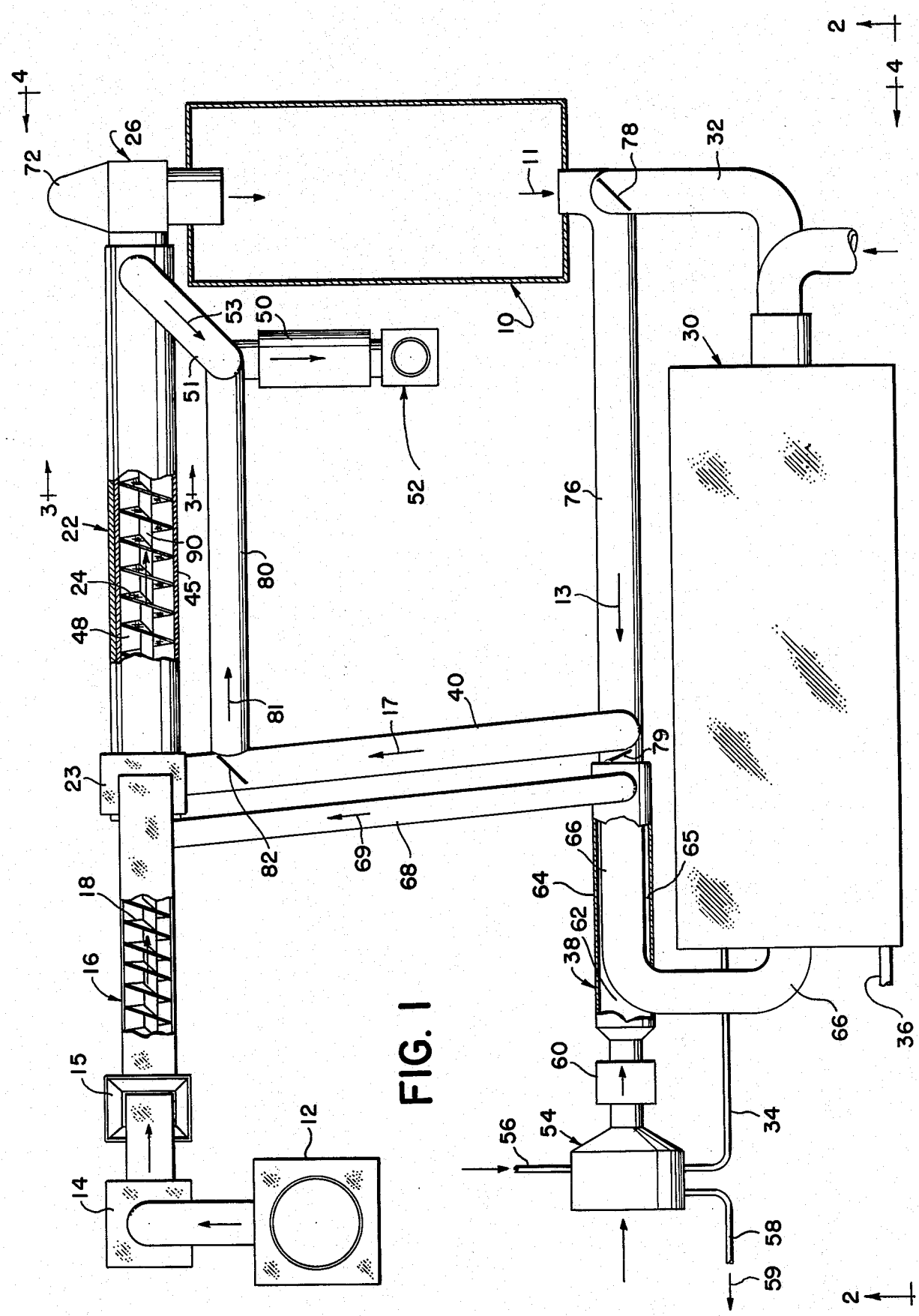
FIG. 1 is a plan view, partially broken away and partly in section, of an embodiment of the present invention.
Figure 2:
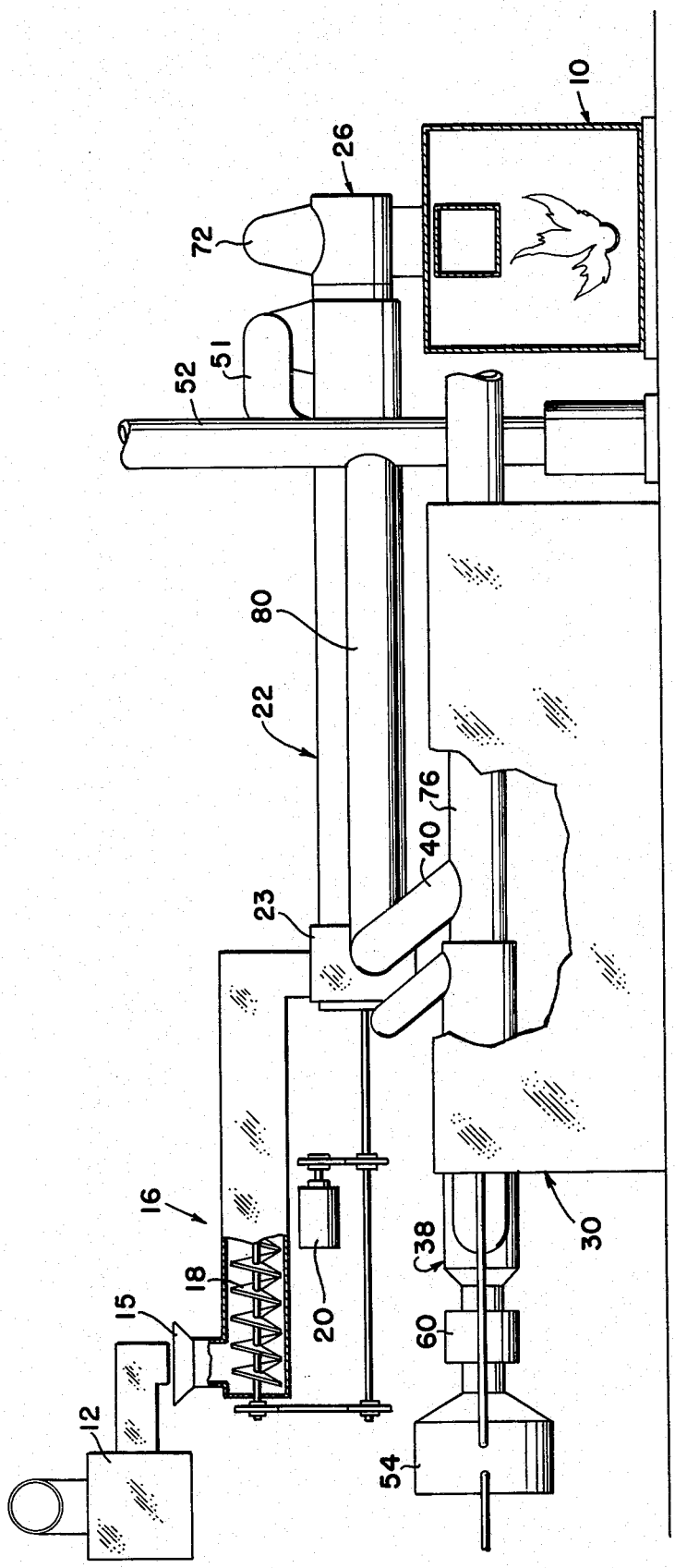
FIG. 2 is a front elevation view, partially broken away and partly in section of the embodiment of the invention, looking from Line 2—2 of FIG. 1.
Figure 3:
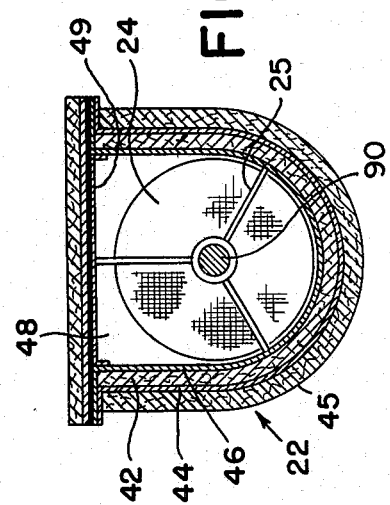
FIG. 3 is a cross sectional view taken along Line 3—3 of FIG. 1 looking in the direction of the arrows.

Referring to FIGS. 1, 2 and 3, an incinerator 10 is employed to incinerate the dried, solid waste (not shown). Prior to being received by the incinerator, solid waste is conventionally broken into small pieces by shredder 12. The shredder 12 may be of conventional design suitable to shred solid waste material into relatively small particles. It is also contemplated that waste could be pulverized prior to introduction into the apparatus into dust size particles to produce more complete combustion. After being shredded, the solid waste is passed to a separator 14. The separator 14 is used in a manner well known to those skilled in the field to remove particular types of debris from the heterogeneous solid waste material. For example, it is desirable to remove and reclaim metals in general, and to separate ferrous metals from non-ferrous metals. Separators have also been designed which will remove glass from solid wastes and then further separate the glass debris by color. Such apparatus and others could all be employed if desired and are encompassed herein by the general term "separator."

As may be best seen in FIG. 2, the shredded or pulverized solid waste material (not shown) is deposited into the hopper 15 of a mixer 16. The solid wastes are mixed and simultaneously are longitudinally moved through the mixer by an auger 18. The auger 18 is conventionally rotated by a motor 20. After being mixed, the waste material is fed into an elongated dryer 22, through a hopper 23, where it is conveyed to the incinerator 10 by the auger 24. (FIG. 1). The auger 24 is conventionally rotatively driven by its shaft 90, which, in the embodiment illustrated, is rotatable by the motor 20. Subsequent to being dried, the solid wastes are fed into a hopper or charge port 26 which serves to feed the waste into the incinerator 10 at an appropriate rate. The incinerator 10 and other equipment comprising the system are generally schematically indicated for system function purposes and construction details have not been set forth.

Figure 5:
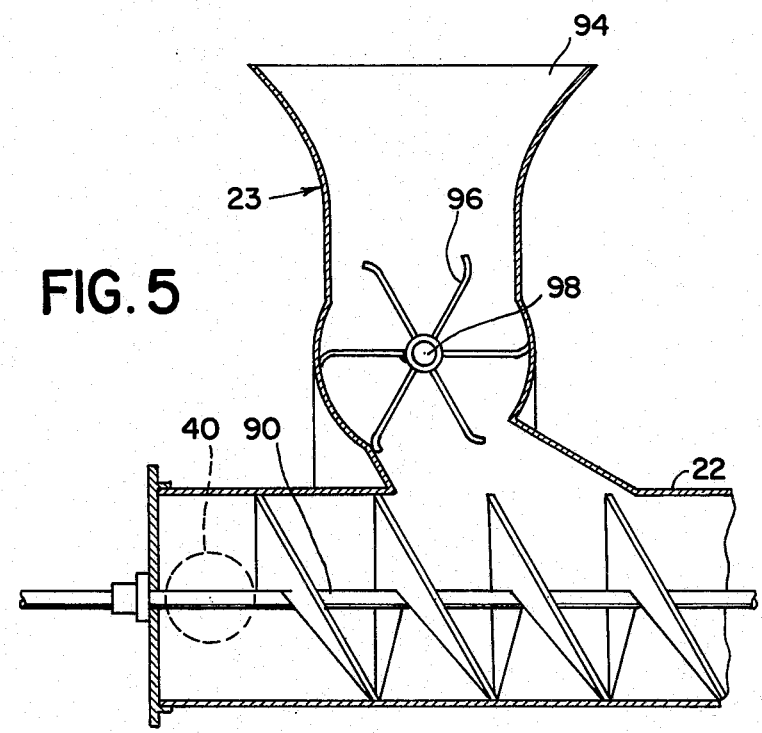
FIG. 5 is an enlarged elevational view of the charging port, partly broken away to show details of interior construction.

As best seen in FIG. 5, the hopper 23 receives the mixed, separated waste material into the open mouth 94 thereof wherein the waste particles fall by gravity onto the blades 96 of a rotary feeder. The blades 96 are rotated by the shaft 98 under impetus of an electric motor (not shown). The respective ends 97 of the blades 96 curl slightly forwardly for waste directing purposes. Additionally, the blade ends 97 cooperate with the curved feed section 99 to form substantially air tight, moving junctions as the blades are rotated to provide an air block between the dryer 22 interior and the open mouth 94 of the hopper 23.

As illustrated in FIG. 1, the hot gases which are generated as a result of the incineration of the solid wastes are fed in the direction of the arrow 11 to a boiler or heat exchanger 30 of known design by a duct 32. The hot gases may be empolyed in well-known manner, by means not shown, to convert water into steam. The boiler feed water which preferably may be preheated, is fed into the boiler by a pipe 34. The steam produced by the boiler or heat exchanger exits via the main steam supply pipe 36. The steam so generated may be advantageously employed to drive a turbine (not shown) which in turn can conventionally drive an electric generator (also not shown). Some of the electrical energy produced by the generator could be utilized to drive the electric motor 20 and other electrical components (not illustrated) which form part of the disposal system. As may be seen in FIG. 1, the motor 20 is used to simultaneously drive the auger 18 of the mixer 16 and the auger 24 of the dryer 22. Exhaust steam from the turbine (if used) could be utilized for heating or other purposes wherein relatively low temperature and low pressure steam could be advantageously employed.

The hot exhaust gases exit from the incinerator 10 and may flow either into the boiler 30 through the duct 32 or toward the dryer 22 through the ducts 76, 40 as indicated by the arrows 13, 17 as hereinafter more fully set forth. The dampers 78, 79 control the gas flow.

As may be best seen in FIGS. 1 and 3, the hot gases from the duct 40 are used to heat the outer shell of the dryer 22. The gases pass through an outer shell or chamber 42 formed by walls 44 and 46 and thus do not mix with the solid wastes which are propelled by the auger 24 through the dryer inner chamber 48. The inner chamber 48 is defined by the inner wall 46 and the top 49 of the dryer. The jacket or shell gases are directed from the dryer 22 to a scrubber 50 in the direction of the arrow 53 by a duct 51 to remove pollutants from the gas. The scrubbed gases are exhausted to the atmosphere by stack 52.

Air used by the system for drying the solid wastes is dehumidified and heated prior to being mixed with the solid wastes in the dryer. Ambient air first enters the system through the condenser 54. The condenser contains conventional condensing surfaces (not shown) which are cooled by cold water entering the condenser from pipe 56. As the air passes over and about the condensing surfaces, the moisture in the air condenses on the condensing surfaces and is drained from the condenser by the pipe 58. The condensate is conventionally drained to a suitable point of disposal, for example a city sewer, as indicated by the arrow 59. The water used to cool the condensing surfaces (not shown) of the condenser 54 is carried by the pipe 34 to the boiler 30 where it is converted to steam.

After being dehumidified, the air passes through the fan 60, which forces air into the system through the heater 38. The heater 38 includes an outer chamber 62 which is defined by a housing 64. A duct 66 carries the hot exhaust gases indirectly from the incinerator 10 and directly from the boiler or heat exchanger 30 after they have passed through the boiler 30. The duct 66 passes through the chamber 62 and defines an annular dry fresh air channel with the housing 64. Preferably, the duct 66 and the housing should be of the same cross sectional configuration although of different sizes. That is both should be round, square, rectangular, etc., of suitable cooperating dimensions to define the annular channel 65. Air from the condenser is heated by conduction as it passes through the annular chamber 65. The hot exhaust gases are directed toward the dryer 22 by the duct 40 from either the duct 76 or the duct 66 or from a combination of the two, as controlled by the damper 79. The ambient air is directed from the heater 38 to the dryer 22 in the direction of the arrow 69 by the duct 68.

Figure 4:
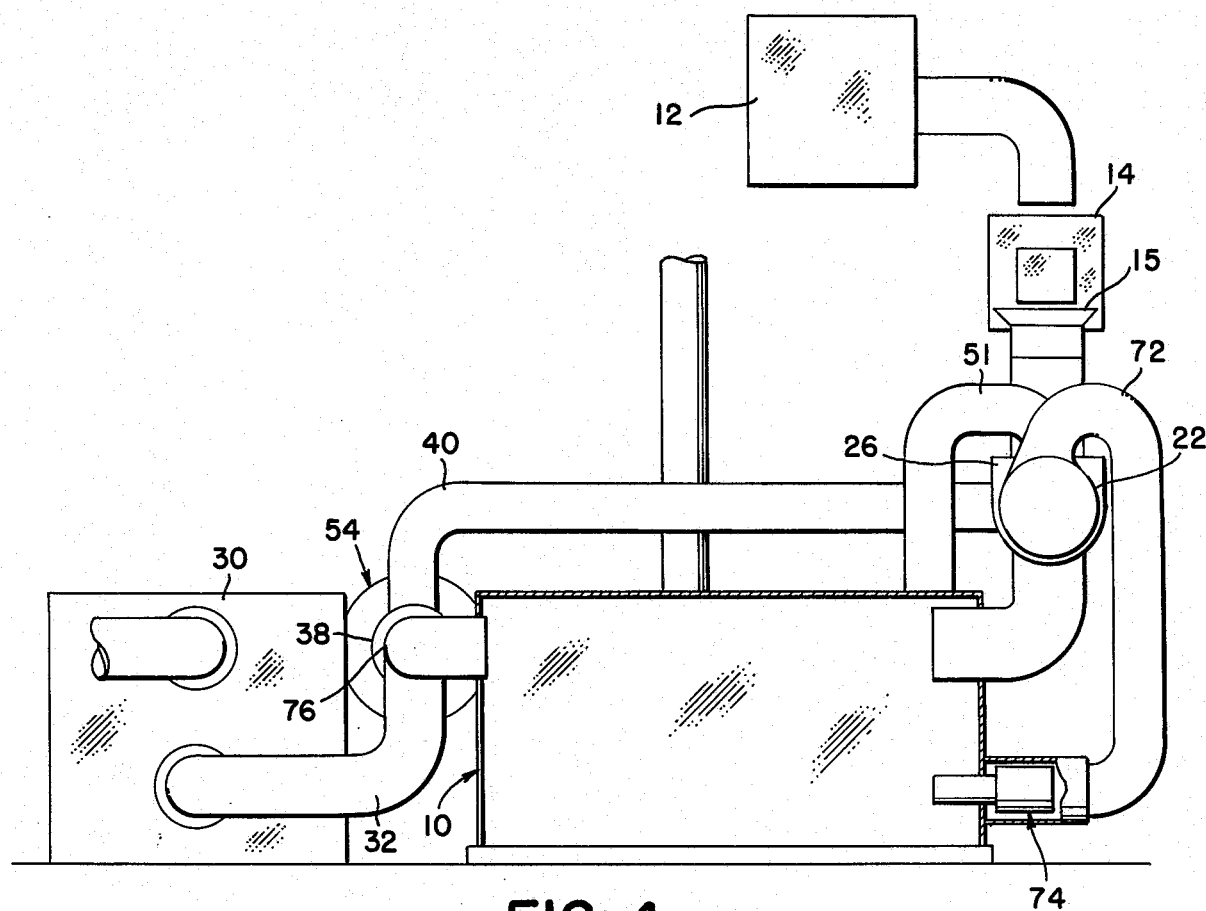
FIG. 4 is an end elevational view partly broken away and partly in section, taken along Line 4—4 in FIG. 1.

As may best be seen in FIGS. 1 and 4, the hot dry ambient air from the heater 38 is fed into the inner chamber 48 of the dryer 22 through the duct 68. The dryer 22 propels and mixes the shredded or particulate solid waste with the hot ambient air through the use of auger 24. The auger 24 is fabricated of a heavy wire mesh or screen 25 which permits free flow of the hot dry ambient air through the auger as the solid waste is propelled by the auger to thereby promote efficient drying of the solid wastes. Although wire mesh is used in the preferred embodiment, the auger 24 may be constructed in any suitable manner which permits air to pass through the auger simultaneously as the waste material is being advanced. For example, a solid metal auger with holes formed therein could be used.

The temperature in the dryer is additionally maintained at an appropriate level through the use of the hot exhaust gases from the incinerator 10 which pass either through the boiler 30 or through the duct 76, into the duct 40. The duct 40 communicates with the dryer outer chamber 42 for dryer shell heating purposes. In order to prevent loss of heat from the dryer 22, insulation 45 is secured to the outer surface of the dryer wall 44.

In the process of drying the solid wastes, the ambient air in the dryer inner chamber 48 becomes laden with dust particles and noxious fumes which result from the disintegration of organic material contained in the solid waste aggregate. The resulting mixture of gases thus represent a potential source of air pollution. It is for this reason that the air used for drying the solid wastes within the dryer 22 is fed into the incinerator 10 by the duct 72. The gases are fed into the incinerator in close proximity to the burner (FIG. 1) and may form part of the burner combustion air. These gases contain a flammable component, as well as oxygen, which may be used in the incineration process. In this manner, some of the particles, which would normally become pollutants if exhausted to the atmosphere, are burned while the unburned particles are passed through the remainder of the system, previously described, to be removed by the scrubber 50.

The incinerator may include a device (not shown) for further pulverizing or grinding the dried solid waste material. The device could be located below the hopper or charge port 26. The smaller waste particles could promote more efficient and complete combustion. This would further minimize the production of pollutants and increase the quantity of heat energy produced by the system.

A by-pass duct 76 is provided to pass the hot exhaust gases from the incinerator 22 directly to the duct 40 instead of requiring passage through the boiler 30. A control damper 78 is positioned at the juncture of ducts 76 and 32 to regulate the volume of hot gases which pass to the boiler and which pass through the by-pass duct 76. Through the use of a servo mechanism (not shown) connected to the damper 78 and a thermostat or thermocouple (not shown) appropriately mounted in the boiler 30, the temperature of the boiler could be automatically regulated.

The temperature of the dryer could be controlled and regulated in a similar manner. A by-pass duct 80 connects the duct 40 and the exhaust duct 51. A servo operated damper 82 is positioned in the juncture of the ducts 40 and 80. The servo mechanism (not shown) could be conventionally controlled by a thermostat or thermocouple (not shown) affixed within the dryer 22. The damper 82 controls the proportion of hot exhaust gases either entering the dryer 22 or by-passing the dryer 22 through the duct 80 for passage directly to the scrubber 50 in the direction of the arrow 81.

Figure 7:
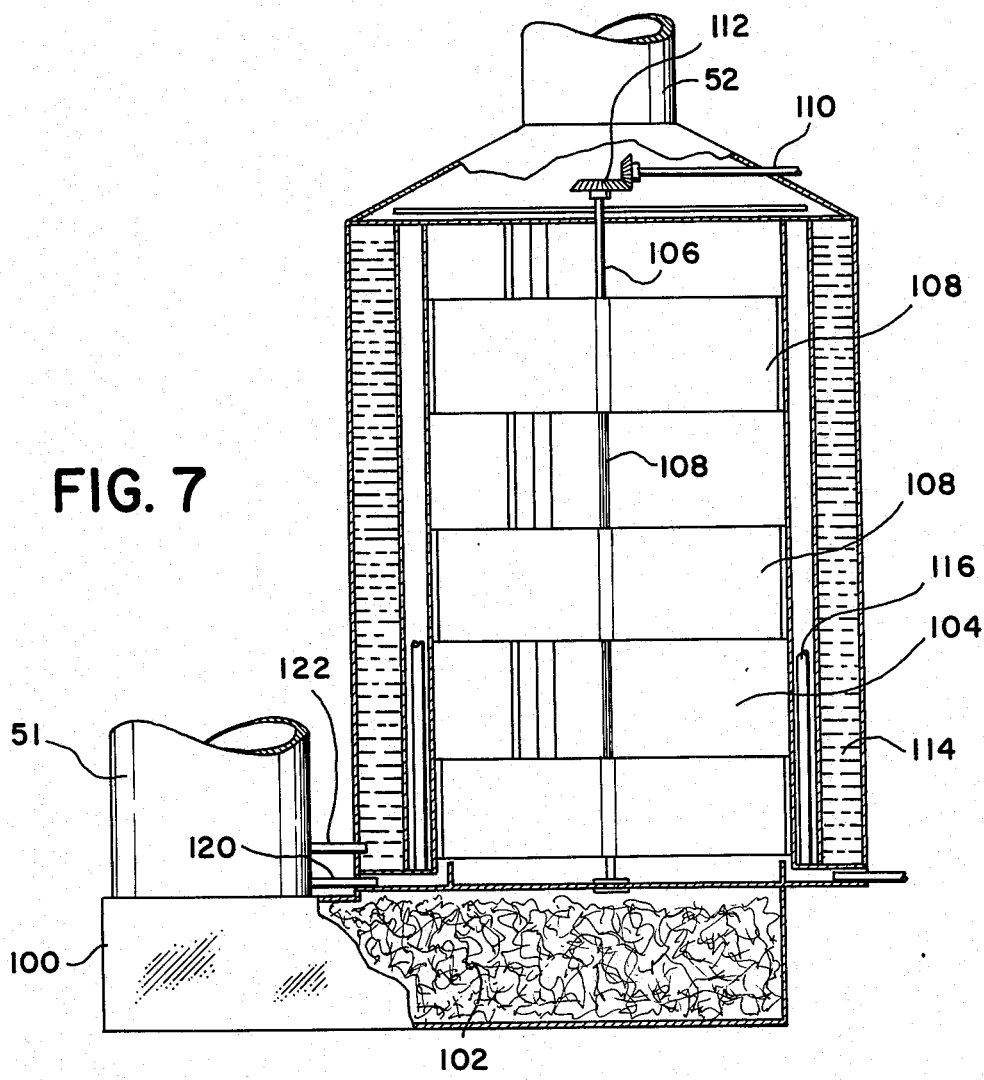
FIG. 7 is a cross sectional view taken along Line 7—7 of FIG. 6, looking in the direction of the arrow.
Figure 6:
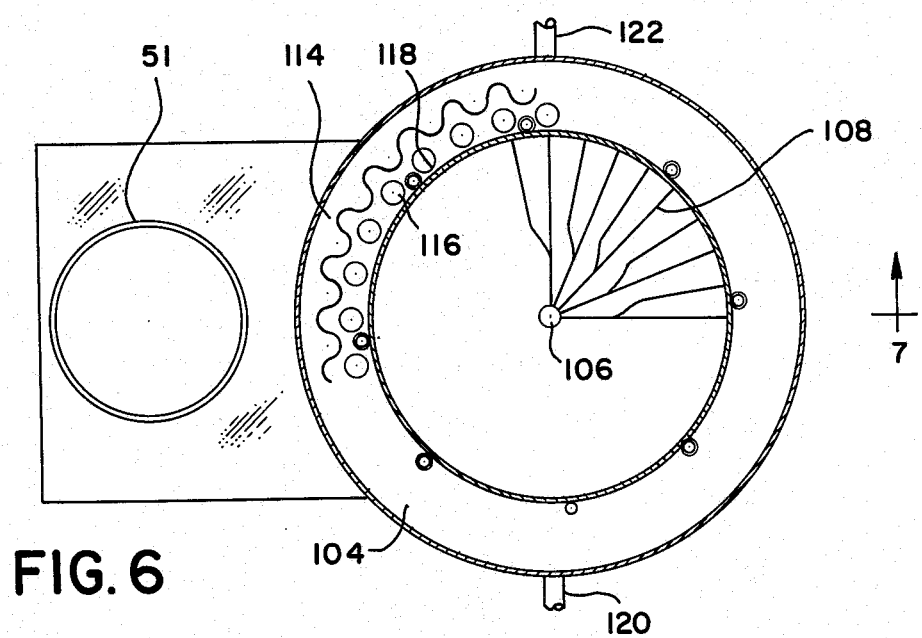
FIG. 6 is an enlarged, top plan view of the scrubber.

Referring now to FIGS. 6 and 7, details of one type of scrubber 51 are set forth. Exhaust gases from the system enter the scrubber from either the exhaust duct 51 or the by-pass duct 80 and are directed into the water bath 100 prior to entering the vane section 104 which leads to the exhaust air stack 52. The water bath 100 contains a stainless steel wool or similar non corrosive material which is generally spread throughout. The water bath contains water and a non foam type of solvent, such as washing soda or the like. The water bath is so positioned that all exhaust gases must pass through for scrubbing prior to entering the vane section 104 or the stack 52.

The vane section may be generally vertically, cylindrically formed with a concentric, vertical shaft 106 journalled therein for rotary movement. A plurality of vanes 108 affix to the shaft 106 and are rotated thereby upon function of the motor driven shaft 110 acting through the eccentric 112. A plurality of cold water tubes 116 surround the vane chamber 104 and are backed by a peripheral, corrugated water barrier 118. Water 114 fills the void between the exterior surface of the water barrier 118 and the inner surface of the outer jacket. Water is supplied through the water supply pipe 122 and condensate is removed from the vane chamber 104 through the drain pipe 120. As the vanes 108 are rotated, they function to throw vapor and moisture retained by the gases as they exit the water 100 against the cold water tubes 116 and the corrugated jacket 118. The tubes 116 and jacket 118 act together to condense vapor prior to the gases being exhausted to atmosphere through the stock 52. It is contemplated that the vanes 108 will be staggered throughout the full height of the vane chamber 104 and may be bent in the direction of rotation.

As may be understood by those skilled in the art, from the foregoing description and drawings, the present invention represents an advance over the prior art. While the invention has been illustrated and disclosed with reference to a particular embodiment, it is to be understood that various changes and modifications may be made without departing from the spirit of the invention.

I claim:

1. A solid waste disposal apparatus for incinerating solid wastes, which comprises:
   (A) a dryer including
      a drying chamber for drying the solid waste, a conveyor positioned within said drying chamber to transport the wastes through the dryer, and means to pass heated air through the dryer said means including an inner chamber within which is positioned the conveyor and an outer shell at least partically surrounding the inner chamber;
   (B) an incinerator for burning the wastes including means to receive the solid wastes from the dryer, a combustion chamber for incinerating the wastes and wherein hot flue gases are generated, and flue gas outlet means for leading the hot flue gases from the incinerator;
   (C) a boiler receiving at least some of the flue gases from the incinerator, said boiler including a heat exchange means to utilize the heat of the hot flue gases, the heat exchange means exhausting the used hot flue gases from the boiler;
   (D) first conduit means adapted to direct hot flue gases from the incinerator or used flue gases from the boiler to the dryer for waste drying purposes, said conduit means being adapted to direct the hot flue gases through the said outer shell;
   (E) a heater surrounding at least a part of the first conduit means and adapted to heat ambient air by utilizing heat from the flue gases, and
   (F) second conduit means adapted to direct the heated ambient air to the dryer.

2. The solid waste disposal apparatus of claim 1 wherein portions of the conveyor within the drying chamber are perforate.

3. The solid waste disposal apparatus of claim 1 wherein the conveyor within the drying chamber includes an auger blade, the said auger blade including means to pass heated gases through the blade.

4. The solid waste disposal apparatus of claim 3 in which the means to pass include at least one opening through the blade.

5. The solid waste disposal apparatus according to claim 3 wherein the auger blade comprises a screen material and wherein the heated ambient air is directed through openings in the screen material.

6. The solid waste disposal apparatus of claim 3 wherein the second conduit means is adapted to direct the heated ambient air to the said inner chamber.

7. The solid waste disposal apparatus of claim 6 wherein the heated ambient air is directed through the said means to pass heated gases through the blade.

* * * * *